ASSOCIATIVE MEMORY

Filed Jan. 2, 1963 3 Sheets-Sheet 1

INVENTORS
JOHN W. BREMER
DWIGHT W. DOSS
BRUCE T. McKEEVER
BY
Samuel E. Turner
ATTORNEY April 4, 1967 J. W. BREMER ET AL 3,312,956

ASSOCIATIVE MEMORY

Filed Jan. 2, 1963 3 Sheets-Sheet 2

United States Patent Office 3,312,956

Patented Apr. 4, 1967

3,312,956
ASSOCIATIVE MEMORY

John Wood Bremer, Sunnyvale, Dwight W. Doss, Santa Clara, and Bruce T. McKeever, Sunnyvale, Calif., assignors to General Electric Company, a corporation of New York Filed Jan. 2, 1963, Ser. No. 249,033
17 Claims. (Cl. 340—173.1)

This invention relates to cryogenic electronic memory devices and particularly to a word-organized associative or data-addressed memory system wherein words are addressed by content rather than by location. The invention relates more particularly to an associative memory system which provides association between successive interrogation words as well as association between an interrogation word and the stored words.

Certain electrical conductors are known to exhibit a loss of electrical resistance at supercold temperatures approaching absolute zero and to regain resistance in the presence of a certain "critical" magnetic field. The critical field depends upon the particular superconductive material as well as its temperature. Superconductive materials requiring comparatively high critical magnetic fields are known as "hard" superconductors while those requiring comparatively low critical magnetic fields are known as "soft" superconductors.

Superconductors can be used to form a cryotron or superconductive switch. In the preferred thin-film form the cryotron comprises a gate conductor film of soft superconductive material which is crossed by a narrow control conductor film insulated therefrom and preferably formed of hard superconductive material. Both the gate conductor and the control conductor are thus normally in the superconducting state. If sufficient current is caused to flow through the control conductor the resulting magnetic field causes the gate conductor to become resistive in the region of the crossover.

Because of low heat losses, cryogenic devices of the thin-film form may be greatly miniaturized and many cryotron elements can be contained in a small volume. Thus cryotron elements are well adapted to the formation of large capacity computer memory units.

In conventional computer memory systems discrete blocks of data or data words are stored at sequentially numbered locations or addresses. To enter a data word into the memory of such a system an address is assigned. The assigned address is then selected by an address register and selection circuit. To retrieve or read out a data word from such a system the address at which the word is stored must ordinarily be known or a lengthy word-by-word search performed.

For certain data-processing problems it is desirable to read or retrieve stored words on the basis of their content rather than their location. Associative memory systems are now known wherein searching time is reduced by interrogating all of the stored words substantially simultaneously and wherein a stored word may be retrieved in response to an interrogation of selected parts of the word. For example, in a data processing system the data words may contain certain data facts concerning employees such as the number of years of service, social security number and salary, as well as other data facts. An entire data word may be retrieved in response to an interrogation for only one data fact of the several data facts constituting a data word. Thus, for example the records of all employees having a given number of years of service may be retrieved.

In such search operations it is clear that there is frequent occurrence of multiple comparisons, that is, more than one data word in the memory matches the interrogation word. To make such matching-word available in sequence, the read-out of all but the first matching word is inhibited. After the desired operations are performed on the first word, the second word is read out, the read-out of all others being inhibited, and so forth.

A memory system which performs the above-described operations is disclosed by John W. Bremer in a copending U.S. patent application Ser. No. 226,517, filed Sept. 27, 1962, entitled Cryogenic Associative Memory which is assigned to the same assignee as the present invention. In that application there is shown and claimed a memory matrix formed of improved bit storage cells and a simplified selection logic circuit which cooperates with the memory matrix to inhibit all except one of multiple interrogation responses according to a predetermined order.

For certain data-processing applications, blocks of data, each block comprising a plurality of related data words, are stored in the memory in sequentially occurring word storage positions. To conserve storage space it is desirable that only the first and the last word of each block of data words contain block identification data, that is, it is desirable to provide association between words in the memory.

It is therefore an object of the invention to select all of the data words of a block of data words in response to an interrogation for block identification data contained in the first and last words of the block.

It is a more specific object of the invention to enable for selection the word storage positions between a pair of word storage positions containing like block identification data.

It is also desirable to provide association between different searches. More specifically it is desirable to provide the logical functions of AND and OR between successive searches. In other words, it is desirable to select only those words which match several different interrogation words to provide the logical AND function. For example, from a file of employee records it may be desirable to retrieve the records of all employees receiving a specified salary and having a specified number of years of service. Alternatively it is desirable to select all words which match any one of more of several different interrogation words to provide the logical OR function. For example, from a file of personnel records it may be desirable to retrieve the records of all persons holding a college degree or having a specified number of years of experience.

It is further desirable to provide the AND function between words within preselected blocks of data words, excluding words outside the preselected blocks which otherwise match the interrogation words.

It is therefore another object of the invention to select all data words which match each of a plurality of interrogation words.

It is another object of the invention to select all data words which match any one or more of a plurality of interrogation words.

It is a further object of the invention to select only from a block of data words which has previously been enabled for selection, all data words which match one or more interrogation words.

These and other objects of the invention are achieved according to the illustrative embodiment of the invention by providing a plurality of bit storage cells arranged in rows and columns, each row of cells providing storage for a data word and each column corresponding to an order or bit position. The selection logic includes a "match-indicating" flip-flop and a "selection" flip-flop for each row, a logic transfer circuit for selectively transferring interrogation information to the match-indicating flip-flops and a "fill-up" circuit for enabling for selection all of the words of a block of data words in response to detection of block identification data contained in the first and last words of the block.

During a search or interrogate operation "word" current in an "associative" line in each row is diverted to a "shunt" line for each word that fails to match the interrogation word. That is, word current remaining in an associative line after an interrogate operation is indicative that the word contained in the corresponding row matches the interrogation word.

The system of the present invention is adapted to perform at least five different modes of associative searching. First, the system is adapted to perform "normal" associative searching wherein each row of storage cells which contains a word matching an interrogation word is enabled for selection. Prior to an interrogation a preset current is applied which directs the word current of each row through the associative line. As mentioned above, the word current of a row which contains a matching word remains flowing in the associative line of the row while in non-matching rows the word current is diverted through the shunt line. The word current in the associative line directs a "transfer" current applied to the logic transfer circuit to set the match-indicating flip-flop of the row thus enabling the row for selection. In this way each row that contains a matching word is enabled for selection.

Second, the system is adapted to logically AND a series of separate searches or interrogations. Ordinarily each interrogation word corresponds to one of the several data facts contained in the stored data words. Each row that is storing a word which contains a data fact that matches the first interrogation word of the series is enabled for selection as in a normal associative search. Interrogations with subsequent interrogation words of the series results in a diversion of the word current from the associative line to the shunt line in each enabled row which contains a word that fails to match any one of the subsequent interrogation words. A transfer current applied to the logic transfer circuit is directed by current in the shunt lines to reset any previously set match-indicating flip-flop in a row containing a non-matching word whereby the previously enabled row is disabled for selection. Thus only the rows of storage cells which contain data words that match each of the interrogation words of the series remain enabled for selection.

Third, the system is adapted to logically OR a series of separate searches or interrogations. After any one of the interrogations the word current in a row which contains a matching word remains in the associative line of the row. A transfer current directed by the word current in the associative line sets the corresponding match-indicating flip-flop. Thus at the end of the series of interrogations, all rows containing words that match one or more of the interrogation words are enabled for selection.

Fourth, the system is adapted to retrieve blocks of data words stored in successive rows of storage cells in response to the detection of block identification data in only the first and last words of a block. Initially all of the match-indicating flip-flops are reset and the word current is caused to flow in the associative lines of each row. An interrogate operation is performed and, as in any interrogation, the word current in rows that contain non-matching words is diverted to the shunt line while the word current remains in the associative line in rows that contain matching words, in this case in rows that contain block identification data. A fill-up current is applied to the fill-up circuit. The word current in the associative line of the row containing the matching first word of a block of words diverts the fill-up current to a "hit" line whereby all the match-indicating flip-flops of the block are set thus enabling all words of the block for selection. The word current in the associative line of the row containing the matching last word of the block diverts the fill-up current from the hit line to a "no-hit" line to prevent enablement of rows outside of the matching blocks.

Fifth, the system is adapted to logically AND a series of separate searches or interrogations within previously enabled blocks of data words while avoiding enablement for selection of rows outside the previously enabled block even though some such rows may contain words that match each of the interrogation words of the series. Each block of data words that matches the block identification interrogation words is enabled for selection as described above, that is, the match-indicating flip-flops of the rows of the block are set. Interrogations with the interrogation words of the series results in a diversion of the word current from the associative line to the shunt line in each row which contains a word that fails to match one of the interrogation words of the series. A transfer current applied to the logic transfer circuit is directed by current in the shunt lines to reset the corresponding match-indicating flip-flops. Thus after the last interrogation of the series only the rows within the previously enabled blocks which contain words that match each of the interrogation words of the series remain enabled for selection.

Selection circuitry, including the selection flip-flop in each row, is provided for selecting the enabled rows in sequence whereby read and/or write operations can be performed. A select operation is performed by applying a select current pulse to a "select" line through the selection logic circuit. When the select current encounters the match-indicating flip-flop of the first enabled row, the set state of the match-indicating flip-flop causes the diversion of the select current from the seelct line to a "bypass" line and the setting of the selection flip-flop of that row. In its set state the selection flip-flop enables the read and write lines of that row so that read and/or write operations can be performed. Since the select current is diverted to the bypass line only the first enabled row is selected.

When read and/or write operations are performed on the first enabled row, the read or write current resets the match-indicating flip-flop to prevent this row from being selected again. When read and/or write operations are completed on this first enabled row, another select current pulse is applied to select the second enabled row. Thus, the first enabled row is selected in response to the first select current pulse, the second enabled row is selected in response to the second select current pulse, and so forth. After all enabled rows have thus been selected in sequence, an "end" cryotron in the select line is resistive in response to a select current pulse thus providing an indication that the system is ready for further search operations.

Thus a versatile associative memory system adapted to perform a variety of modes of associative searching is provided wherein similar structure is employed in each row. The structure, organization and operation of the invention is described more specifically in the following detailed description with reference to the accompanying drawings in which.

Figure 1:
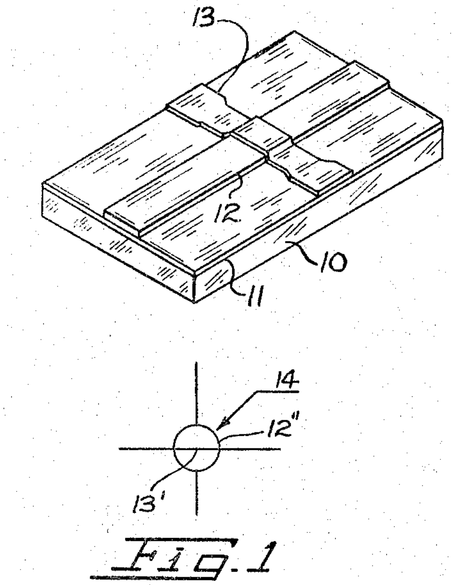
FIGURE 1 is a perspective view of an example of the structure of a thin-film cryotron together with a schematic symbol thereof.

Shown in FIG. 1 is an example of the structure of the thin film form of a basic cryotron or superconductive switching element. Thin film cryotron circuitry is ordinarily formed on a flat base or substrate such as a substrate 10. A substrate is ordinarily formed of an insulating material having a smooth surface such as glass. In order to decrease circuit inductance it is preferable to provide a superconductive shield plane 11 underlying the cryogenic circuitry. The shield plane 11 may be formed of a thin film of hard superconductive material such as lead. A layer of insulating material such as silicon monoxide, not shown, is formed over the shield plane 11 to insulate the subsequently formed structure therefrom.

The active portions of the cryotron comprise a gate conductor 12 hereinafter referred to as a "gate" which is crossed by a control conductor 13 hereinafter referred to as a "control." The control 13 is insulated from the gate 12 by a film of insulating material such as silicon monoxide. The gate 12 is formed of soft superconductive material such as tin while the control 13 is formed of a hard superconductive material such as lead. Thus the magnetic field resulting from a sufficient current flow in the control 13 causes the gate to become resistive in the region of the cross-over while the superconductivity of the hard superconductive material of the control 13 is not destroyed. Thus the cryotron comprises a two-state device, that is, the gate is superconductive in the absence of a current in the control and the gate is resistive in the presence of a current in the control which exceeds a predetermined design threshold.

Also shown in FIG. 1 is a schematic symbol 14 which is used herein to represent a cryotron. The gate is represented by a circle 12′ and the control by a line 13′ crossing the circle. (A more detailed discussion of cryotrons is given by John W. Bremer in "Superconductive Devices," chapter 2, McGraw-Hill Book Company Inc., New York, 1962.)

Figure 2:
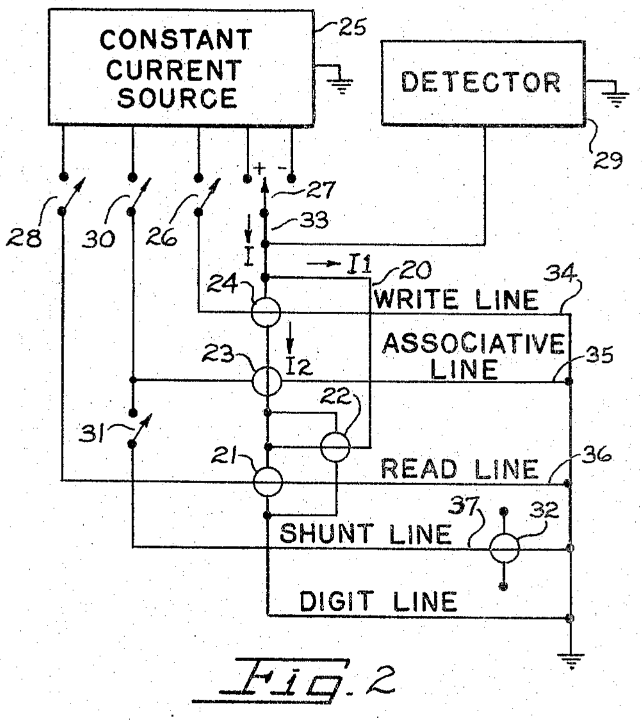
FIGURE 2 is a schematic diagram of a storage cell which may be employed in the practice of the invention.

A bit storage cell which may be used to form the memory matrix of the associative memory of the present invention is shown in FIG. 2. This storage cell is shown and claimed in the aforementioned patent application Ser. No. 226,517.

Briefly, the storage cell includes a cryotron controlled superconductive loop in which a persistent circulating current can be established to represent a bit of information. Binary information can thus be stored by the cell according to the direction of the persistent current. According to the convention followed in the present description, the cell is considered to be storing a binary "1" when the persistent current is flowing clockwise in the loop and a binary "0" when the persistent current is flowing counterclockwise.

Structure is provided for writing in the cell, that is, for establishing a persistent current in a selected direction in the persistent current loop, for reading from the cell, that is, for detecting the direction of a stored persistent current, for interrogating the cell, that is, for comparing an applied bit representing indication with the bit representing state of the cell, and for indicating the result of the interrogation.

The storage cell includes four cryotrons 21–24, a branch circuit 20, a digit line 33, a write line 34, an associative line 35, a read line 36 and a shunt line 37. A persistent current loop is formed by branch circuit 20, the gate of cryotron 24 and the control of cryotron 23, the branch circuit 20 including the control of cryotron 22.

A constant current source 25 supplies currents for circuit operation. The source 25 supplies currents of unit magnitude, a current of unit magnitude being defined as at or above the cryotron control threshold value, that is, a current of unit magnitude through the control of a cryotron renders the gate of the cryotron resistive.

The persistent current loop provides two parallel paths for a digit current I, a first path through the branch circuit 20, current therein being designated a current I1, and a second path through the gate of cryotron 24 and the control of cryotron 23, current in this second path being designated a current I2. ("Downward" currents are considered positive herein while "upward" currents are considered negative.) The cell is preferably constructed so that the inductance of the I1 and I2 current paths are equal. In such case the magnitude of a stored persistent current is substantially one-half the magnitude to the applied digit current, that is, one-half unit magnitude. (The cryotron 23 has a control current threshold of greater than one-half unit current. Thus a stored persistent current through the control of cryotron 23 does not make the gate thereof resistive.)

A current in the write, associative, read or shunt lines is designated a "word current." It is so designated because these lines pass through all the storage cells of a row of cells for storing a word in the memory. It is arranged that the word current flows in only one of the lines of a row at any given time.

Write and read operations are fully described in the aforementioned patent application No. 226,517 and will not be detailed here. Briefly, to write a "1," that is, to establish a clockwise persistent current in the storage cell, a positive (downward) digit current I is applied, by means of a switch 27 for example, to the digit line 33. A word current is simultaneously applied to the write line 34 by closing a switch 26. The word current in the write line 34 renders the gate of cryotron 24, and therefore the I2 current path resistive. Since the branch circuit 20 (the I1 current path) remains superconductive, substantially all of the applied digit current flows therethrough. The word current in the write line 34 is now turned off allowing the gate of cryotron 24 and therefore the I2 current path to become superconductive. The stored energy due to the inductance of the branch circuit 20 forces negative (upward) current flow in the now superconductive I2 current path and a persistent current, comprising currents I1 and −I2, is thus established in the loop to represent a "1."

The writing of a "0," that is, the establishment of a counterclockwise persistent current, is similar to the writing of "1" as described above with the difference that a negative (upward) rather than a positive digit current is applied to the digit line 33. Thus in the case of a stored "0" the established persistent current comprises the currents −I1 and I2.

A read operation, that is, the detection of the direction of a persistent current in the loop, is performed by applying word current to the read line 36, for example, by closing a switch 28, and applying a positive digit current to the digit line 33, the read line 36 includes the control of cryotron 21 and thus the word current in the read line renders the gate of cryotron 21 resistive. Since the I1 and I2 current paths are both superconductive, the applied digit current divides in inverse proportion to the inductance of the two paths. Because the inductances are assumed to be equal in the present illustrative example, the digit current divides equally, thus adding or subtracting a current of one-half unit magnitude to or from the currents I1 and I2, as the case may be. In the case of a stored "1" the loop current is clockwise and thus the digit current adds to the persistent current in the I1 current path and subtracts from the persistent current in the I2 current path. Thus, in the case of a stored "1," when the digit current is applied the current I1 is of unit magnitude. This current through the control of cryotron 22 renders the gate of this cryotron resistive. Since the gate of cryotron 21 is also resistive, due to the read current, the digit current encounters resistance in the digit line 33. The voltage drop due to this encountered resistance may be detected, for example, by a voltage detector 29 connected to the digit line, to indicate a stored "1."

In the case of a stored "0," that is, the detection of a counterclockwise persistent current, the applied digit current adds to the current in the I2 current path and subtracts from the current in the I1 current path. Thus the current I1 becomes substantially zero and the gate of cryotron 22 and therefore the digit line 33 remains superconductive, the consequent absence of resistance to the digit current being indicative of a stored "0."

The storage cell of FIG. 2 includes interrogation structure for providing an indication of whether or not the bit stored in the cell matches an interrogation bit. To perform an interrogation operation a switch 30 is closed to apply a word current to the associative line 35 which includes the gate of cryotron 23. A switch 31 is then closed thus placing the shunt line 37 in parallel with the associative line and providing an alternative path for the word current. It is noted however that the word current continues to flow in the associative line at this time. This is according to the principle that if a current is established in one of a plurality of parallel superconducting paths, it will continue to flow in that path to the exclusion of the other paths until a resistance or other influence is imposed to divert the current.

To interrogate for a "1" the switch 27 is closed to apply a positive downward digit current to the digit line 33. In other words, in an interrogate operation an applied positive digit current represents a "1" interrogation bit. The applied digit current divides to flow through the two current paths provided by the persistent current loop. Assuming that the persistent current in the loop is clockwise to represent a stored "1," the digit current adds to the persistent current in the I1 current path and subtracts in the I2 current path. Thus during the application of the digit current the current I2 is substantially zero. Therefore the gate of cryotron 23 remains superconductive and the word current continues to flow in the associative line 35 thus indicating a match or identity between the "1" interrogation bit and the "1" stored bit.

As another example, the case of an interrogation for a "0" when the storage cell contains a "1" will be described. To interrogate for a "0" a word current is established in the associative line 35 and the switch 31 is then closed as described above. The switch 27 is then closed to apply a negative digit current to the digit line 33, an applied negative digit current representing a "0" interrogation bit. This upward flowing digit current divides between the two paths of the persistent current loop thus adding to the upward persistent current in the I2 current path making a total current of unit magnitude in this path through the control of cryotron 23. The gate of cryotron 23 thus becomes resistive. This causes the word current to be diverted from the associative line 35 to the shunt line 37 to thus indicate a mismatch or lack of identity between the "0" interrogation bit and the stored "1" bit. A cryotron 32 may be provided to sense the presence of the word current in the shunt line 37.

The cases of interrogation for a "1" and a "0" when the storage cell contains a "0" will not be described. Operation in these cases is believed to be readily deducible from the above described examples. In summary, when the stored bit matches the interrogation bit, the gate of cryotron 23 remains superconductive and the word current remains in the associative line. When the stored bit is different from the interrogation bit, that gate of cryotron 23 is rendered resistive and the word current is diverted to the shunt line.

Figure 3:
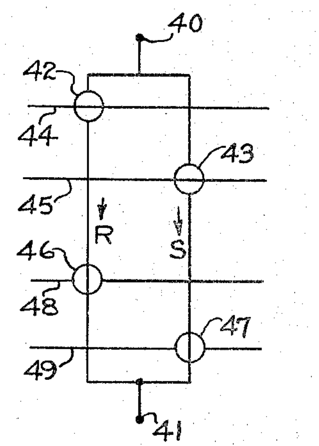
FIGURE 3 is a schematic diagram of a "J-cell" flip-flop as employed in the illustrated embodiment of the invention.

In FIG. 3 there is schematically illustrated a cryotron circuit called a "J cell." While the circuit and its operation are relatively simple, a clear understanding of the circuit will aid the understanding of the system of the invention to be described hereinafter.

The J cell is formed of a pair of parallel current paths. Cryotrons in each path may be controlled to direct the current applied to the cell through one or the other of the alternative current paths thus providing input control of the cell. Other cryotrons in the current paths provide an output indication from the cell.

The J cell provides two different functions in the present system. By applying a continuous constant current to the cell it can be employed as a two state device or flip-flop. The J cell can also be used as an information transfer circuit by applying appropriately timed current pulses to the cell. Operation of the J cell as a flip-flop will be described first with reference to FIG. 3.

The J cell illustrated in FIG. 3 comprises a pair of parallel current paths between a pair of terminals 40 and 41 to which a continuous constant current is applied for flip-flop operation. Operation is such that one or the other of the current paths is superconductive at any given time. A current established in one superconductive path remains in that path even though the other path subsequently becomes superconductive, thus the J cell flip-flop is a two state device having a "set" state when the applied current is flowing in a given path and a reset state when the current is flowing in the other path. Thus when the applied current is flowing in the lefthand path, the J cell flip-flop is arbitrarily considered to be in its reset state as indicated by an arrow and a letter R in FIG. 3. When the current is flowing in the righthand path, the flip-flop is thus in its set state as indicated by an arrow and the letter S. The lefthand path may thus be designated the reset path or side and the righthand path may be designated the set path or side.

A cryotron 42 in the reset path and a cryotron 43 in the set path provide input control of the flip-flop. A current applied to an input line 44 renders the gate of cryotron 42 hence the reset path resistive thus diverting the flip-flop current to the set path. Similarly, a current applied to an input line 45 resets the flip-flop by rendering the gate of cryotron 43 resistive thus diverting the flip-flop current to the reset path.

A pair of cryotrons 46 and 47 are provided to indicate the state of the flip-flop. If the flip-flop is in the reset state the flip-flop current flows through the control of cryotron 46 thus rendering the gate of cryotron 46 and hence an output line 48 resistive while an output line 49 is superconductive because of the absence of current through the control of cryotron 47. When the flip-flop is in the set state the line 48 is superconductive while the line 49 is resistive. These resistive and superconductive conditions of output lines 48 and 49 may be used in a variety of ways to communicate the state of the flip-flop to other circuitry.

To employ the J cell as an information transfer circuit the cell is supplied with a pulse of current at terminals 40 and 41 when the transfer of information from input lines 44 and 45 to output lines 48 and 49 is desired. The input information is represented by a current in one or the other, but not both, of the lines 44 and 45. Current in the line 44 causes the pulse of current applied to terminals 40 and 41 to flow through the control of cryotron 47 thus rendering output line 49 resistive. Similarly, current in input line 45 causes output line 48 to be resistive, thus transferring information from the input to the output lines.

Figure 4:
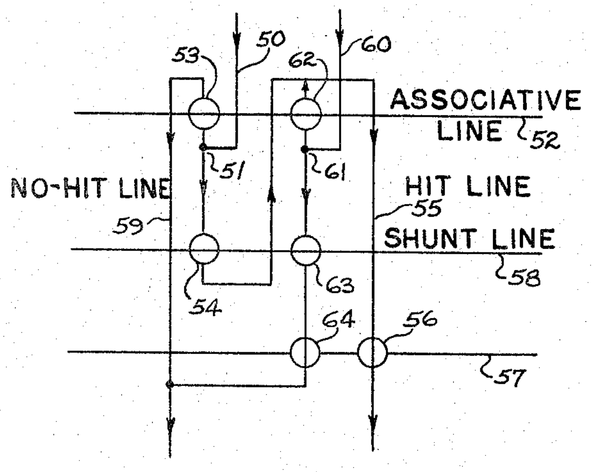
FIGURE 4 is a schematic diagram of the fill-up circuit contained in each row of the illustrated embodiment of the invention.

A portion of a circuit called a fill-up circuit as is included in each row of the system is separately shown in FIG. 4. An introduction to this circuit will aid the understanding of the system of the invention to be described hereinafter. The fill-up circuit is used for block selection and operates to enable for selection all of the rows of storage cells of a block even though only the first and last rows of the block contain block identification data. Thus to enable a block, the memory is interrogated with an interrogation word corresponding to the block identification data in the first and last rows of the block.

Since the words in the first and last rows match the interrogation word, the word currents of these rows remain in the associative lines; however, the word currents of the intervening rows are diverted to the shunt lines. A current called a fill-up current is now applied to a line 50 which is connected to a junction 51.

If the word current is flowing in an associative line 52 (thus indicating that the row contains a word which matches the interrogation word) the gate of a cryotron 54 is superconductive. The fill-up current therefore flows through the gate of cryotron 54 and thence down a line called a hit line 55. (For purposes of illustration the fill-up current is shown flowing in a generally downward direction. However, the current may be in either direction.)

The hit line 55 contains the control of a cryotron 56. Thus the fill-up current in the hit line renders the gate of cryotron 56 and hence a line 57 resistive. Line 57 is in the reset side of a match-indicating flip-flop of the row. Thus current in the hit line 55 sets the flip-flop to enable for selection the corresponding row.

If, however, the word current is flowing in a shunt line 58, instead of the associative line, when the fill-up current is applied to the line 50, the gate of cryotron 54 is resistive and the gate of cryotron 53 is superconductive. The fill-up current therefore flows through the gate of cryotron 53 and thence down a line called a no-hit line 59. (The no-hit line 59 is connected to the line 50 of the subsequent row.) The fill-up current in the no-hit line 59 does not affect the line 57.

A line 60 is connected between the hit line of the previous row and a junction 61. Thus the fill-up current received over line 60 from the hit line of the previous row flows through the gate of a cryotron 62 to the hit line 55 or through the gate of a cryotron 63 and the control of a cryotron 64 to the no-hit line 59 depending on whether the word current is in the shunt line 58 or the associative line 52. In either case, the line 57 is rendered resistive thus setting the match-indicating flip-flop and enabling the row for selection. Additional explanation of the operation of the fill-up circuit is given in the following description of the memory system of the invention with reference to FIGS. 5A and 5B.

Figure 5A:
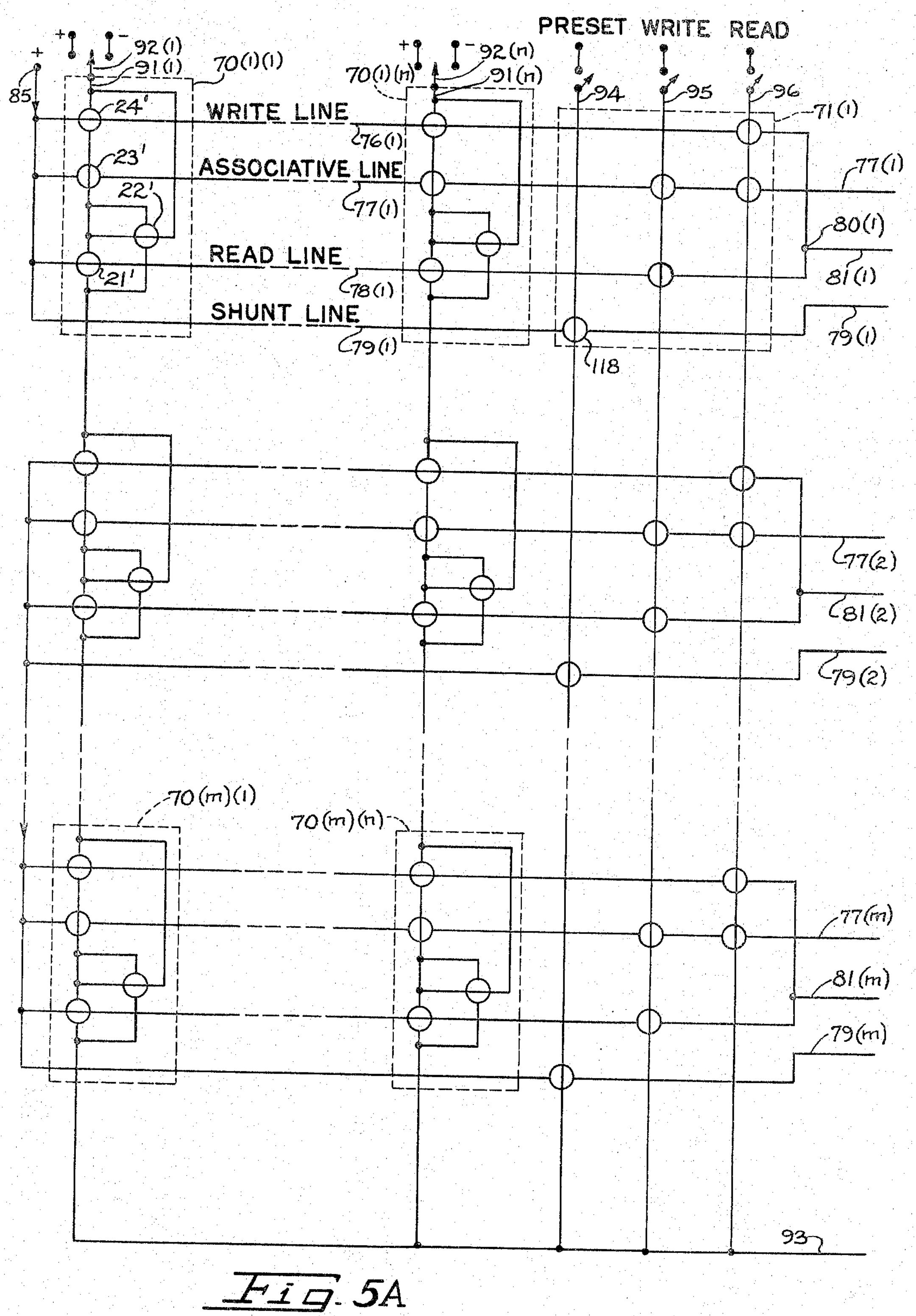
FIGURE 5, parts A and B taken together, is a schematic diagram of the illustrated embodiment of an associative memory system according to the invention.
Figure 5B:
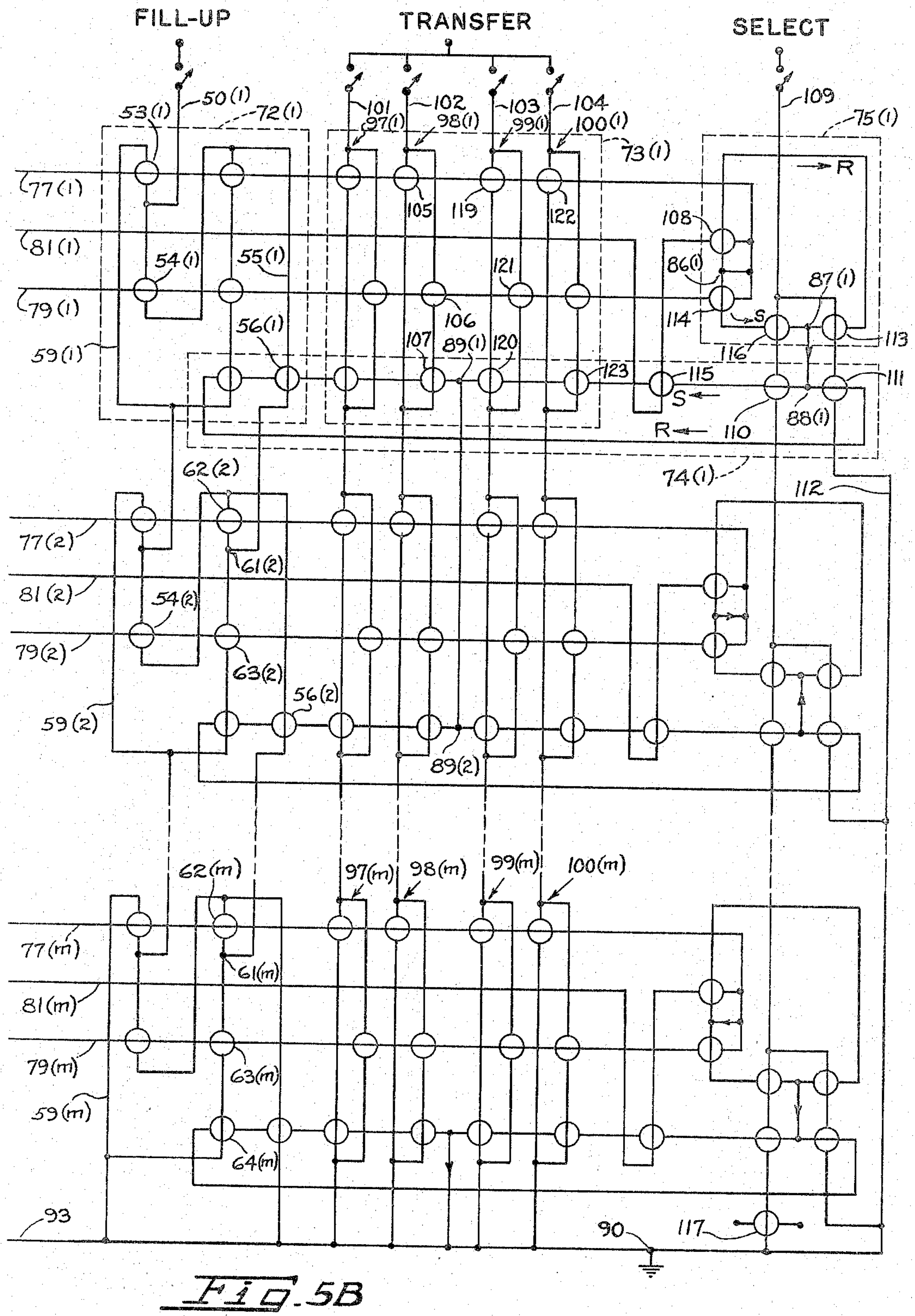

An embodiment of an associative memory system according to the invention is shown in FIGS. 5A and 5B. Alignment of the right-hand edge of FIG. 5A with the left-hand edge of FIG. 5B provides a complete schematic illustration of the system.

The rows of storage cells and the operation control circuits of the system are shown in FIG. 5A. The fill-up circuit, logic transfer circuits, match-indicating circuits and selection circuits are shown in FIG. 5B.

The structure of the system along with explanation of operation of circuits not previously described will be presented first followed by examples of system operation in performing the various kinds of associative searches.

The storage portion of the system (FIG. 5A) is formed of rows and columns of bit storage cells of the kind shown in FIG. 2 and described hereinbefore. For read and write operations the memory is word organized, that is, all of the digits or bits of one word are written or read at the same time. In interrogate or search operations the selected bits, corresponding to the interrogation word, of all words in the memory are interrogated simultaneously.

The storage portion of the system includes a plurality of bit storage cells **70(1)(1)–70(*m*)(*n*)** arranged in *m* rows and *n* columns. Thus the first row contains storage cells **70(1)(1)–70(1)(*n*) and the first column contains storage cells 70(1)(1)–70(*m*)(1). Each row of storage cells stores a word, the columns corresponding to the digit or bit positions. To simplify the drawing only the first and last storage cells of each row are shown. Also only the four "corner" cells of the resulting two-dimensional array of cells are separately identified and are enclosed in dashed lines for this purpose. For convenience of identification similar reference numbers are applied to cryotrons 21′–24′ of the storage cell 70(1)(1)** as are applied to the corresponding cryotrons in FIG. 2.

For clarity of identification of the functional parts of the structure of each row, such functional parts of the first row are enclosed in dashed lines and are identified as follows: the plurality of storage cells **70(1)(1)–70(1)(*n*), mentioned above, a portion 71(1) of a control circuit, a portion 72(1) of a fill-up circuit as described hereinbefore in connection with FIG. 4, a portion 73(1) of the logic transfer circuit, a match-indicating flip-flop 74(1) and a selection flip-flop 75(1)**. Each of the other rows of the system is formed of like structure which is one advantage of the system of the invention.

Each row or word position includes write, associative, read and shunt lines, referred to collectively as row lines. Thus the row lines of the first row include a write line 76(1), an associative line 77(1), a read line 78(1) and a shunt line 79(1). The write and read lines are joined at a junction 80(1) and become a write-read line 81(1). The row lines form alternative current paths for a word current applied to a terminal 85 which is connected to a source of constant current (not shown).

Referring to the first row, the row lines, the selection flip-flop 75(1) and the match-indicating flip-flop 74(1) are connected in series for the word current. Furthermore, the rows of the memory system are connected in series for the word current. Thus assuming that the word current flows into the terminal 85, it flows through one of the row lines 76(1)–79(1) of the first row into a junction 86(1) and out of a junction 87(1) of selection flip-flop 75(1), into a junction 88(1) and out of a junction 89(1) of the match-indicating flip-flop 74(1) and thence into a junction 89(2) of the match-indicating flip-flop of the second row. After passing through the match-indicating and selection flip-flops of the second row, the word current flows leftward through one of the row lines of the second row and thence to a lead connected to the right-hand ends of the row lines of the next row etc., the word current eventually flowing into a current return terminal 90.

Each column or bit position of the array of storage cells **70(1)(1)–70(*m*)(*n*) includes a respective digit line 91(1)–91(*n*) each connected between a respective digit switch 92(1)–92(*n*) and a current return line 93 which, in turn, is connected to the current return terminal 90. Each switch 92(1)–92(*n*)** is operable to connect the corresponding digit line to a source of positive or negative digit current or the switch may be left open to omit interrogation of that bit position, that is, to mask the interrogation. An interrogation word is thus represented by the state of these digit switches. A switch closed to allow positive or downward digit current represents a "1" interrogation bit or digit, a switch closed to allow negative or upward digit current represents a "0" bit and an open switch represents a masked bit.

A plurality of control lines 94, 95 and 96 selectively receive currents to control cryotrons in the row lines to thus control the system operations of preset, write and read. The cryotrons thus controlled prevent word current flow in one or more of the word lines of each row depending on the operation to be performed.

As mentioned hereinbefore, during an interrogation operation the word current remains in the associative line when the word contained in the storage cells of the row matches the interrogation word, but the word current is diverted to the shunt line when the stored word does not match the interrogation word. Thus each row may be considered as having two states during an interrogate operation, a matching state when the word current remains flowing in the associative line and a non-matching state when the word current has been diverted to the shunt line. Circuitry is provided for communicating the state of the row lines to the match-indicating flip-flop of the row. A logic transfer circuit in each row, such as transfer circuit 73(1) of the first row, provides this function.

The transfer circuit of each row comprises four J cell transfer circuits, for example, the transfer circuit 73(1) of the first row comprises J cells 97(1), 98(1), 99(1) and 100(1). The corresponding transfer J cells of the plurality of rows of the system are connected in series by a respective one of a plurality of transfer lines 101–104 to which transfer currents may be selectively applied. As mentioned above, the transfer circuits serve the purpose of communicating information in the row lines to the match-indicating flip-flops.

The match-indicating flip-flop 74(1) of the first row, for example, has two states depending on the path which the word current takes from terminal 88(1) to terminal 89(1). The flip-flop 74(1) is considered to be in its set state when the word current flows in the path indicated by the arrow and the letter S and in its reset state when the current flows in the path indicated by the arrow and the letter R.

As an example of the transfer of information by the transfer circuit 73(1) from the row lines to the match-indicating flip-flop 74(1), consider the case when the flip-flop 74(1) is in its reset state and the word current is flowing in associative line 77(1). The word current in associative line 77(1) renders the gate of a cryotron 105 resistive while the gate of a cryotron 106 remains superconductive due to the absence of the word current in the shunt line 79(1). Thus a transfer current applied to line 102 flows through the gate of cryotron 106 and thence through the control of a cryotron 107 thereby rendering the gate of cryotron 107 resistive. This resistance in the reset side of flip-flop 74(1) causes the current through the flip-flop to be diverted from the reset to the set path.

The transfer circuit 73(1) provides all the combinations of logic transfer of the states of the row lines, as represented by the word current in the associative or shunt line, to the match-indicating flip-flop of the row. For example in the first row, the J cell 97(1) is responsive to a transfer current in line 101 and word current in shunt line 79(1) to set flip-flop 74(1), J cell 98(1) is responsive to transfer current in line 102 and word current in associative line 77(1) to set flip-flop 74(1) as described above, J cell 99(1) is responsive to transfer current in line 103 and word current in shunt line 79(1) to reset flip-flop 74(1), and J cell 100(1) is responsive to transfer current in line 104 and word current in associative line 77(1) to reset flip-flop 74(1). Because the corresponding J cells of all the rows of the system are in series for the transfer current the transfer action takes place in all of the rows at substantially the same time.

At the conclusion of a search or interrogate operation the match-indicating flip-flops indicate which rows of the system are enabled for selection and which rows remain disabled for selection, an enabled row being indicated by the set state of its match-indicating flip-flop, the state of the match-indicating flip-flop having been determined by the operation of the fill-up circuit or the transfer circuit in cooperation with the word current in the associative or shunt line of the row. A selection circuit is provided for selecting the enabled rows one at a time, in sequence, whereby read and/or write operations can be performed in the storage circuits of the selected row.

The selection circuit comprises a plurality of selection flip-flops, one in each row of the system. For example, the first row includes the selection flip-flop 75(1). The flip-flop 75(1) has two states, a set state when current is flowing from the terminal 86(1) to terminal 88(1) in the path indicated by the arrow and the letter S and a reset state when the current is flowing in the path indicated by the arrow and the letter R. Initially the selection flip-flops are in the reset state, in which state the write-read lines are resistive. For example, when the flip-flop 75(1) is in its reset state the word current from the row lines enters the terminal 86(1) and flows through the control of a cryotron 108 in the reset side of flip-flop 75(1) thus rendering the gate of cryotron 108 and hence the write-read line 81(1) resistive thus preventing word current flow in the read and write lines to disable the row for write and read operations.

To perform a select operation a select current pulse is applied to a select line 109. Assuming that match-indicating flip-flop 74(1) is set to enable the first row for selection, the gate of a cryotron 110 is resistive due to the current in the set path of flip-flop 74(1). However, the gate of a cryotron 111 is superconductive because of the absence of current in the reset path of flip-flop 74(1). The select current is therefore diverted from the select line 109 to a bypass line 112 through the control of a cryotron 113. This current through the control of cryotron 113 causes the gate of the cryotron 113 to be resistive thus setting selection flip-flop 75(1) by diverting the current therein to the set path. This current in the set path of flip-flop 75(1) causes the gate of a cryotron 114 to be resistive to prevent word current flow in the shunt line 79(1). With selection flip-flop 75(1) in its set state the gate of cryotron 108 becomes superconductive thus enabling the write and read lines. In this way the first enabled row is selected for read and write operations while all other rows remain unselected, it being noted that when the select current is diverted to the bypass line the selection flip-flops of all subsequent rows are bypassed.

Read and write operations are performed as described hereinbefore in the description of FIG. 2, all bit positions of the selected row being read or written simultaneously. A control current applied to write control line 95 causes the word current to flow in the write line of the selected row. A control current applied to read control line 96 causes the word current to flow in the read line of the selected row. In other (unselected) rows the word current flows in the shunt line.

When read and write operations are performed the word current in the selected row resets the match-indicating flip-flop no that this row is not again selected by the next select current pulse. For example, in the first row the word current in the read or write lines flows in the write-read line 81(1). This current renders resistive the gate of a cryotron 115 thus resetting match-indicating flip-flop 74(1).

When read and write operations are completed in the first selected row a second select current pulse is applied to line 109 to select the next enabled row. With match-indicating flip-flop 74(1) in its reset state the select current flows through the control of a cryotron 116, the gate of cryotron 110 and thence down the select line to the second row. The select current renders the gate of cryotron 116 resistive and thus the selection flip-flop 75(1) is reset. The gate of cryotron 108 becomes resistive and the first row is thus now unselected.

In the second enabled row the match-indicating flip-flop will have been set during the search operation. Due to the set state of the match-indicating flip-flop, the select current is diverted to the bypass line thus causing the selection flip-flop to assume its set state to thereby select this row for read and write operations as described above.

When read and write operations are completed in the second selected row, a third select current pulse is applied to line 109 to select the third enabled row, and so forth. When all the enabled rows have been selected in sequence, as described above, the next select current pulse flows through the control of an "end" cryotron 117. The resistive condition of the gate of this cryotron may be detected to signal that the system is ready for another search or interrogate operation. It is noted that at the end of a search operation all of the selection flip-flops are in the reset state. Further details of the structure and operation of the system are given in the following examples of the various kinds of associative searches that the system is adapted to perform.

The system is adapted to perform what may be considered the normal or conventional associative searching wherein each row which contains a word that matches an interrogation word is enabled for selection. Prior to an interrogation a preset current pulse is applied to preset control line 94 which renders resistive the shunt line of each row. For example, the preset current through the control of a cryotron 118 renders the gate of cryotron 118 and hence the shunt line 79(1) resistive. The preset operation assures that the word current is flowing in the associative line of each row prior to a search or interrogate operation. (The write and read lines are resistive due to the reset state of the selection flip-flops. For example, due to the reset state of selection flip-flop 75(1) the gate of cryotron 108 is resistive.)

An interrogate operation is now performed by applying appropriate currents to appropriate ones of the digit lines 91(1)–91($n$) to represent the interrogation word. As explained hereinbefore, the word current of a row which contains a word that matches the interrogation word remains flowing in the associative line of the row while in rows containing a non-matching word the word current is diverted to the shunt line. This information represented by the word current in the associative or shunt lines is next transferred to the match-indicating flip-flops by the operation of the transfer circuit. Transfer current pulses are applied to transfer lines 102 and 103. The transfer current applied to line 102, through the J cells 98(1)–98($m$), causes the match-indicating flip-flop of each row in which the word current is flowing in the associative line to assume the set state to thereby enable such rows for selection. The transfer current applied to line 103, through J cells 99(1)–99($m$) assures that the match-indicating flip-flop of each row in which the word current is flowing in the shunt line is reset to thereby assure that such rows are disabled for selection.

For example, assuming that the first row contains a matching word and therefore the word current is flowing in the associative line 77(1), the transfer current applied to transfer line 102 flows through the control of cryotron 107 because of the resistive condition of the gate of cryotron 105 due to the word current through the control of cryotron 105. The gate of cryotron 107 therefore becomes resistive to set the match-indicating flip-flop 74(1) thereby enabling the first row for selection. The transfer current applied to line 103 in such a case flows through the righthand side of J cell 99(1) because of the resistive condition of the gate of a cryotron 119 and therefore this transfer current has no effect on the match-indicating flip-flop 74(1).

On the other hand, assume that the first row does not contain a matching word and therefore the word current is flowing in the shunt line 79(1). In such a case the transfer current applied to line 102 flows through the left-hand path of J cell 98(1), because of the resistive condition of the gate of cryotron 106, and therefore has no effect on the flip-flop 74(1). However, the transfer current applied to transfer line 103 now flows through the control of a cryotron 120 because of the resistive condition of the gate of cryotron 121. The gate of cryotron 120, which is in the set path of flip-flop 74(1) now becomes resistive to assure that the flip-flop is in the reset state.

In the above described manner, the match-indicating flip-flop of each row that contains a matching word is set to enable the row for selection. A selection operation may then be performed as described hereinbefore.

The system is also adapted to logically AND a series of separate searches or interrogations. That is, at the conclusion of the series of interrogations only the rows containing words which match all of the interrogation words remain enabled for selection. It is assumed in this case that the stored words are composed of several data facts, each data fact being stored in a predetermined group of storage cells or bit positions of a row. Ordinarily each interrogation word of the series of interrogation words corresponds to one of the data facts.

Operation of the system to logically AND a series of separate interrogations is as follows: Operation of the system for the first interrogation of the series is similar to the normal associative search as described above, namely, the preset current is applied to line 94, currents representing the first interrogation word are applied to appropriate ones of the digit lines 91(1)–91($n$), then transfer currents are applied to transfer lines 102 and 103 whereby the match-indicating flip-flop of each row which contains a word that matches the first interrogation is set to enable the row for selection.

Prior to interrogation with the second interrogation word of the series, a preset current pulse is again applied to preset line 94 to cause the word current to flow in the associative line in each row. Digit currents are then applied to appropriate ones of the digit lines 91(1)–91($n$) to represent the second interrogation word. As in any interrogation, the word current is diverted from the associative line to the shunt line in each row which contains a word that does not match the interrogation word. A transfer current pulse is now applied to transfer line 103. In each row wherein the word current is flowing in the shunt line the transfer current is directed by the corresponding one of the J cells 99(1)–99($m$) to render resistive the set side of the match-indicating flip-flop of the row. In this way any row which was enabled as a result of the interrogation with the first interrogation word of the series is disabled for selection (its match-indicating flip-flop is reset) if the word contained in the row does not also match the second interrogation word. However, any previously enabled row remains enabled (its match-indicating flip-flop remains in the set state) if the word contained in the row matches the second interrogation word.

For each row there are four possible cases, the word contained in the row may not match either the first or the second interrogation word, it may match the first but not the second interrogation word, it may match the second but not the first interrogation word, or it may match both interrogation words. Thus as a more specific example consider first the case when the word contained in the first illustrated row does not match either the first or the second interrogation word.

In response to interrogation with the first interrogation word the word current in the associative line 77(1) is diverted to the shunt line 79(1). The transfer currents are applied to lines 102 and 103. Because of the word current in the control of cryotron 121 the transfer current applied to line 103 flows through the control of cryotron 120 thus resetting flip-flop 74(1) if it is not already in the reset state.

In response to interrogation with the second interrogation word the word current is again diverted to the shunt line 79(1). Transfer current is now applied only to transfer line 103 and again this transfer current flows through the control of cryotron 120. The match-indicating flip-flop 74(1) thus remains in its reset state and the first row remains disabled for selection.

Consider next the case when the word in the first row matches the first but not the second interrogation word. In this case, in response to the interrogation with the first interrogation word the word current remains in the associative line 77(1). When transfer currents are now applied to lines 102 and 103 the transfer current applied to line 102 flows through the control of cryotron 107 thus setting the match-indicating flip-flop 74(1) thereby enabling the first row for selection. (The transfer current applied to line 103 flows through the righthand side of J cell 99(1) due to the resistive condition of cryotron 119 and therefore has no effect on match-indicating flip-flop.)

In response to interrogation with the second interrogation word the word current is diverted to the shunt line 79(1) since it is assumed for this case that the word in the first row does not match the second interrogation word. A transfer current now applied to line 103 flows through the control of cryotron 120 thus resetting the match-indicating flip-flop 74(1) thereby disabling the first row for selection.

Consider next the case when the word in the first row does not match the first interrogation word but does match the second interrogation. Because the word in the first row does not match the first interrogation word the match-indicating flip-flop 74(1) is placed in, or retains, the reset state as a result of the interrogation with the first interrogation word. In response to interrogation with the second interrogation word the word current remains in the associative line 77(1) to indicate the match. However, the match-indicating flip-flop 74(1) remains in the reset state and the row remains disabled for selection because the transfer current, applied only to line 103 after the second interrogation, flows through the righthand side of the J cell 99(1) and does affect the flip-flop.

Finally, consider the case where the word in the first row matches both the first and the second interrogation words. In this case the match-indicating flip-flop 74(1) is set as a result of the interrogation with the first interrogation word and it remains in the set state after the interrogation with the second interrogation word and therefore the row remains enabled for selection.

While the logical ANDing of a series of two interrogations is specifically explained above, the series may contain any number of interrogations. Operation of the system for interrogation with 3rd, 4th . . . and *n*th interrogation word is entirely similar to the operation for the second interrogation described above. Thus at the conclusion of the series of interrogations only those rows containing words that match each interrogation word of the series remain enabled for selection. These enabled rows may be sequentially selected by operation of the selection circuitry as described hereinbefore.

The associative memory system of the invention is also adapted to logically OR a series of separate interrogations. A preset pulse is first applied to line 94 to assure that the word current is flowing in the associative line of each row. Next, a transfer current pulse is applied to transfer line 104. This transfer current flows through the righthand paths of the J cells 100(1)–100(*n*) thus assuring that the match-indicating flip-flops are in the reset state. For example, the word current in associative line 77(1) renders resistive the gate of a cryotron 122. The transfer current applied to line 104 therefore flows through the control of a cryotron 123 in the set side of match-indicating flip-flop 74(1) thus rendering the gate of cryotron 123 resistive thereby assuring that flip-flop 74(1) is in the reset state.

Digit currents are now applied to appropriate ones of the digit lines 91(1)–91(*n*) to represent the first interrogation word of the series. This results in diversion of the word current from the associative line to the shunt line in each row wherein the stored word does not match the first interrogation word. A transfer current pulse now applied to line 102 sets the match-indicating flip-flop in each row which contains a matching word.

For each subsequent interrogation of the series the sequence of operation as follows: A preset pulse is applied to line 94 to force the word current through the associative lines, digit currents are applied to appropriate ones of the digit lines 91(1)–91(*n*) to represent the respective interrogation word, and a transfer current pulse is then applied to line 102 thus setting the match-indicating flip-flop of each row which contains a word that matches the respective interrogation word. Thus after the last interrogation of the series the match-indicating flip-flops of all rows which contain words that match one or more of the interrogation words of the series are in the set state and therefore these rows are enabled for selection. The enabled rows may be sequentially selected as previously described.

The associative memory system is further adapted to enable for selection a block of successive rows which contain a block of data words wherein block identification data is contained only in the first and last words of the block. By requiring block identification data in only the first and last rows of the block, valuable storage space is conserved. For purposes of illustrating the operation of the system in performing this function, assume that the first row illustrated in FIG. 5 is the first row of a block to be enabled and the bottom row is the last row of the block.

Operation of the system is as follows: A preset current pulse is applied to line 94 to assure that the word current is flowing in the associative lines. Digit currents are then applied to appropriate ones of the digit lines 91(1)–91(*n*) in accordance with the interrogation word corresponding to the block identification data contained in the first and last rows of the block. The word current therefore remains in the associative lines 77(1) and 77(*m*), the first and last rows of the block, but is diverted to the shunt lines of the intervening rows (line 79(2) of the second row) since the words in the intervening rows do not match the interrogation word.

The fill-up circuit of the system now comes into play. (An introduction to this circuit is presented hereinbefore with reference to FIG. 4.) A fill-up current is applied to a line 50(1). The gate of a cryotron 53(1) is resistive due to the word current in associative line 77(1). The fill-up current therefore flows through the gate of a cryotron 54(1) and thence down a hit line 55(1). The current in this line flows through the control of a cryotron 56(1) the gate of which is in the reset side of match-indicating flip-flop 74(1) thus setting this flip-flop to enable the first row for selection.

The fill-up current enters the fill-up circuitry of the second row at a junction 61(2). Since this row contains a non-matching word, the word current is in the shunt line 79(2) thus rendering resistive the gates of a pair of cryotrons 54(2) and 63(2). The fill-up current therefore flows through the control of a cryotron 62(2) and thence down a hit line 55(2) and through the control of a cryotron 56(2) thus setting the match-indicating flip-flop of the second row. In this way all rows between the first and last rows of the block are enabled for selection even though these rows do not contain matching words, the matching block identification data being in only the first and last rows.

Assuming that the lowest row in FIG. 5 is the last row of the block to be enabled for selection, the fill-up current enters this row at a terminal 61(*m*). Since this row contains block identification data there is a match with the interrogation word and therefore the word current is in the associative line 77(*m*). The gate of a cryotron 62(*m*) is therefore resistive while the gate of a cryotron 63(*m*) is superconductive because of the absence of current in the shunt line 79(*m*). Thus the fill-up current flows through the gate of cryotron 63(*m*) and the control of a cryotron 64(*m*) and thence to a no-hit line 59(*m*) thus setting the match-indicating flip-flop of the last row to enable this row for selection in response to block identification data in only the first and last rows of a block.

It is noted that in the last row of an enabled block the fill-up current is diverted to the no-hit line of the row. The current therefore passes through the no-hit lines of subsequent non-matching rows and their match-indicating flip-flops remain in the reset state.

It is further noted that several blocks of rows of the memory may contain similar block identification data. In such a case the fill-up current is directed through the hit lines of each such block to enable all of the several blocks for selection in the same manner as the first block is enabled as described above.

The system is further adapted to logically AND a series of separate interrogations within previously enabled blocks of rows while avoiding enablement of rows outside of the previously enabled blocks even though some such rows may contain words that match each of the interrogation words of the series.

This operation is a combination of the block selection and ANDing of interrogations described hereinbefore. The block of rows is enabled for selection as described hereinbefore with the result that the match-indicating flip-flops of the rows within the block are in the set state while the match-indicating flip-flops of rows outside of the block are in the reset state. A preset current pulse is then applied to line 94 to assure that the word current is flowing in the associative lines. The series of interrogations to be ANDed are now carried out in sequence. After the series of interrogations the word current remains in the associative line only in each row which contains a word that matches all of the interrogation words of the series. In all other rows the word current is diverted to the shunt lines.

A transfer current now applied to transfer line 103 is responsive to current in a shunt line to reset the corresponding match-indicating flip-flop. This results in the disabling for selection of the previously enabled rows within the block which contain words that do not match all of the interrogation words of the series. Because no setting transfer current, but only a resetting transfer current, is applied, any rows outside of the block which contain words that match all of the interrogation words of the series are nevertheless not enabled for selection.

The foregoing examples illustrate the versatility of the system of the present invention, but these examples are not exhaustive of the capabilities of the system. For example, each stored word that does not match an interrogation word may be retrieved by appropriate operation of the transfer circuit to thereby achieve the logical NOT or Inversion function. More specifically, the application of a transfer current pulse to transfer line 101 results in setting the match-indicating flip-flop in each row that has the word current in its shunt line.

Also, combinations of functions may be involved in a given search. For example, from a file of employee records it may be desirable to retrieve the records that match the following criteria: job title of "Physical Chemist" and either "Ph.D. degree and two years experience" or "M.S. degree and five years experience" and "not presently working on a classified project." This example involves the logical functions of AND, OR and NOT, and may be accomplished by appropriate sequences of interrogations and operation of the logic transfer circuit to first enable for selection the rows of the memory containing records which match the education and experience criteria and then to disable for selection (by application of transfer current to line 104) any previously enabled rows which contain records that match the classified project criterion whereby the latter records are excluded.

As another example of system capability, all of the rows of the memory may be enabled for selection by applying transfer current to transfer lines 101 and 102. This places all of the match indicating flip-flops in the set state. Further capabilities of the system and the operation to achieve the same will be clear from the foregoing description and examples.

While the principles of the invention have been made clear in the illustrative embodiments, there will be obvious to those skilled in the art, many modifications in structure, arrangement, proportions, the elements, materials, and components, used in the practice of the invention, and otherwise, which are adapted for specific environments and operating requirements, without departing from these principles. The appended claims are therefore intended to cover and embrace any modifications within the limits only of the true spirit and scope of the invention.

What is claimed is:

1. In an associative memory system having a plurality of word storage positions and containing blocks of data words, each block of data words being stored in sequentially occurring word storage positions and only the first word and the last word of each block containing block identification data, the combination of: means for interrogating said memory with selected block identification data; means responsive to said interrogation for detecting said first and last words of each block of data words containing said selected block identification data; and means responsive to the detection of said first and last words for enabling for selection all of the word storage positions of each block of data words which contains said selected block identification data in its first and last word storage positions.

2. In a data-addressed memory system having a plurality of word storage means arranged in rows and containing blocks of data words, each block of data words being stored in sequentially occurring rows and only the first and last rows of each block containing block identification data, means for enabling for selection each block which contains block identification data that matches a selected interrogation word, comprising: a first line and a second line in each row providing alternative paths for a word current; means for performing an interrogate operation including means for comparing the data word in each row with said selected interrogation word; means responsive to said interrogate operation for causing word current to flow in said first line of each row which contains a word that matches said interrogation word and for causing word current flow in said second line of each row which contains a word that does not match said interrogation word; a match indicating circuit in each row, said circuit having a first state for enabling said row for selection and a second state for disabling said row for selection each said circuit initially being in said second state; a fill-up circuit in each row including: a first input terminal and a second input terminal, a no-hit line connected to the first input terminal of the fill-up circuit of the next subsequent row, and a hit line connected to the second input terminal of the fill-up circuit of said next subsequent row; means for applying a fill-up current to the first input terminal of the fill-up circuit of the first row, the fill-up circuit of each row further including: means responsive to fill-up current received at said first terminal and word current in said second line for directing said fill-up current through the no-hit line of the row, means responsive to fill-up current received at said first terminal and word current in said first line for directing said fill-up current through the hit line of the row, means responsive to fill-up current received at said second terminal and word current in said first line for directing said fill-up current to the no-hit line of the row, and means responsive to fill-up current received at said second terminal and word current in said second line for directing said fill-up current through the hit line of the row; and means responsive to said fill-up current when directed from said second terminal to said no-hit line and when directed through the hit line for causing the match-indicating circuit of the row to assume said first state thereby enabling said row for selection.

3. In a data-addressed memory system having a plurality of word storage means arranged in rows and containing blocks of data words, each block of data words being stored in sequentially occurring rows and only the first and last rows of each block containing block identification data, means for enabling for selection each block with contains block identification data that matches a selected interrogation word, comprising: a first line and a second line in each row providing alternative paths for a word current; means for performing an interrogate operation including means for comparing the data word in each row with said selected interrogation word; means responsive to said interrogate operation for causing said word current to flow in said first line of each row which contains a word that matches said interrogation word and for causing said word current to flow in said second line of each row which contains a word that does not match said interrogation word; a match indicating circuit in each row, said circuit having a first state for enabling said row for selection and a second state for disabling said row for selection, each said circuit initially being in said second state; a fill-up circuit including like fill-up circuit portions in each row; means for applying a fill-up current to said portions in series, said fill-up circuit further including means responsive to word current in said first line of each successive pair of rows having said word current in said first line for directing said fill-up current to cause the match-indicating circuits of each said pair of rows and of the rows intervening the rows of each said pair of rows to assume said first state to thereby enable for selection all rows of each block of data words which contains block identification data in its first and last rows that matches said selected interrogation word.

4. In a data-addressed memory system having a plurality of word storage positions and containing blocks of data words, each block of data words being stored in corresponding blocks of sequentially occurring word storage positions and only the first word and the last word of each block containing block identification data, the combination of: means for interrogating said memory with selected block identification data; means responsive to said interrogation for detecting and providing indications of said first and last word storage positions of each block of data words containing said selected block identification data; an enabling circuit for each word storage position settable to a condition for enabling the position for selection; and a fill-up circuit operable in response to said indications for setting to said condition the enabling circuits of all of the word storage positions of each block of word storage positions providing said indications.

5. In an associative memory system having a plurality of word storage positions, each word storage position including a plurality of bit storage cells for storing the bits of a word, the combination of: a match indicating circuit for each word storage position, said circuit having a first state for enabling the word storage position for selection and a second state for disabling the word storage position for selection; means for interrogating a first plurality of selected storage cells of all of said word storage positions with a first interrogation word; means responsive to the interrogation with said first interrogation word for setting to its first state the match indicating circuit of each word storage position which contains a word matching said first interrogation word; means for interrogating a second plurality of selected storage cells of all of said word storage positions with a second interrogation word; and means responsive to the interrogation with said second interrogation word for resetting to its second state the match indicating circuit of each previously enabled word storage position which contains a word that does not match said second interrogation word.

6. In an associative memory system having a plurality of word storage positions for storing data words, each data word including a plurality of data facts, the combination of: a match indicating circuit for each word storage position, said circuit having a first state for enabling the word storage position for selection and a second state for disabling the word storage position for selection; means for interrogating said word storage positions with a first interrogation data fact; means responsive to the interrogation with said first interrogation data fact for setting to its first state the match indicating circuit of each word storage position which contains a word matching said first data fact; means for interrogating said word storage positions with a subsequent series of interrogation data facts; and means responsive to the interrogations with said subsequent series of interrogation data facts for resetting to its second state the match indicating circuit of each previously enabled word position which contains a word that does not match all of the interrogation data facts of said subsequent series of interrogation data facts.

7. In an associative memory system having a plurality of word storage positions, each word storage position including a plurality of bit storage cells for storing the bits of a word, the combination of: a match indicating circuit for each word storage position, said circuit having a first state for enabling the word storage position for selection and a second state for disabling the word storage position for selection; means for interrogating a first plurality of selected storage cells of all of said word storage positions with a first interrogation word; means responsive to the interrogation with said first interrogation word for setting to its first state the match indicating circuit of each word storage position which contains a word matching said first interrogation word; means for interrogating a second plurality of selected storage cells of all of said word storage positions with a second interrogation word; means responsive to the interrogation with second interrogation word for setting to its first state the match indicating circuit of each word storage position which contains a word matching said second interrogation word; and means for selecting in turn for selected operations each word storage position having its match indicating circuit in said first state.

8. In a data-addressed memory system having a plurality of word storage positions for storing data words, each data word including a plurality of data facts, the combination of: means for interrogating said word storage positions with a series of interrogation data facts; means responsive to each interrogation for providing indications of each storage position that contains a word matching at least one of said interrogation data facts; a match indicating circuit associated with each word storage position, said match indicating circuit being operable when in a given state for enabling the position for selection; and means operable after each interrogation for transferring said indications to the associated match indicating circuits for placing in said given state the match indicating circuit associated with each word storage position which contains a word that matches at least one of said interrogation data facts.

9. In an associative memory system having a plurality of word storage positions and containing blocks of data words, each data word including a plurality of data facts, each block of data words being stored in sequentially occurring word storage positions and only the first word and the last word of each block containing block identification data facts, the combination of: means for interrogating said word storage positions with a first interrogation word corresponding to a selected block identification data fact; means responsive to the interrogation with said first interrogation word for detecting said first and last words of each corresponding block of data words; means responsive to said detection for enabling for selection the word storage positions containing the words of said each corresponding block of data words; means for interrogating said word storage positions with a second interrogation word corresponding to a selected data fact; means responsive to the interrogation with said second interrogation word for detecting words in said memory that fail to match said second interrogation word; and means responsive to the detection of said words in said memory that fail to match said second interrogation word for disabling for selection the previously enabled word storage positions containing the non-matching words.

10. In an associative memory system having a plurality of word storage positions and containing blocks of data words, each data word including a plurality of data facts, and each block of data words being stored in sequentially occurring word storage positions, the combination of: means for detecting a block of data words corresponding to selected block identification data; means responsive to the detection of a block of data words for enabling for selection the word storage positions containing said block of data words; means for interrogating said memory with a selected data fact; detection means for indicating the data words in said memory that fail to match said data fact; and means responsive to said detection means for disabling for selection previously enabled word storage positions which contain data words that fail to match said data fact.

11. A current directing circuit comprising: a first terminal; a second terminal; means for selectively applying current to one of the terminals; a first output line; a first cryotron, the gate of said first cryotron being connected between said first terminal and said first output line; a second output line; a second cryotron, the gate of said second cryotron being connected between said second terminal and said second output line; a third cryotron, the gate of said third cryotron being connected between said first terminal and said second output line; a fourth cryotron, the gate of said fourth cryotron being connected between said second terminal and said first output line; a first control line including the controls of said first and second cryotrons; a second control line including the controls of said third and fourth cryotrons; and means for selectively applying current to one of the control lines for directing the current applied to the selected one of said terminals to one of said output lines.

12. In a word storage system comprising a plurality of rows of storage cells, each row adapted to store a word, means for enabling all of said rows for selection, comprising: a line in each row; means for causing word current to flow in said line of each row; an indicating circuit in each row, said indicating circuit having a plurality of states and said indicating circuit operable in a predetermined one of the said states to enable the corresponding row for selection; and a selectively operable transfer circuit responsive to word current in said line of each row to cause the corresponding indicating circuits to assume said predetermined one of the said states.

13. In an associative memory system, the combination of: a row of storage elements for storing a memory word; a pair of row lines in said row; means for applying a word current to one of said row lines, the other of said row lines providing an alternate path for said word current; interrogation means for performing a comparison between said memory word and an interrogation word; means responsive to said comparison for directing said word current, a match between said memory word and said interrogation word being indicated by flow of said word current in a predetermined one of said row lines, a mismatch between said memory word and said interrogation word being indicated by flow of said word current in the other of said row lines; an information representing circuit having a plurality of information representing states; and a selectively operable transfer circuit for selectively transferring information indicated by said word current in said row lines to said information representing circuit.

14. In an associative memory system, the combination of: a row of storage elements for storing a memory word; a pair of row lines in said row; means for applying a word current to one of said row lines, the other of said row lines providing an alternate path for said word current; interrogation means for performing a comparison between said memory word and an interrogation word; means responsive to said comparison for directing said word current, a match between said memory word and said interrogation word being indicated by flow of said word current in a predetermined one of said row lines, a mismatch between said memory word and said interrogation word being indicated by flow of said word current in the other of said row lines; a match-indicating circuit; and a selectively operable transfer circuit for selectively transferring either directly or inversely the comparison information indicated by said word current in said row lines to said match-indicating circuit.

15. In an associative memory wherein a first predetermined relation between a stored word and an interrogation word is represented by a word current in an associative line and wherein a second predetermined relation between said stored word and said interrogation word is represented by said word current in a shunt line, the combination of: an information indicating circuit having first and a second state; a first selectively operable transfer circuit responsive to said word current in said shut line to place said information indicating circuit in said first state; a second selectively operable transfer circuit responsive to said word current in said associative line to place said information indicating circuit in said first state; a third selectively operable transfer circuit responsive to said word current in said shunt line to place said information indicating circuit in said second state; and a fourth selectively operable transfer circuit responsive to said word current in said associative line to place said information indicating circuit in said second state.

16. In a data-addressed memory system having a plurality of word storage positions for storing data words, the combination of: means for interrogating said word storage positions with at least one first search criterion; means for enabling for selection each word storage position that contains a word which matches said first search criterion; means for interrogating said memory with at least one second search criterion; and means for disabling for selection each previously enabled word storage position that contains a word which matches said second search criterion.

17. In a data-addressed memory system having a plurality of record storage positions, each record including a plurality of data facts, the combination of: means for interrogating said storage positions with first search criteria including at least one interrogation data fact; means responsive to the interrogation with said first search criteria for providing an indication of each storage position that contains a record which matches said first search criteria; selectively operable means responsive to said indication of each storage position that contains a record which matches said first search criteria for enabling for selection each corresponding storage position; means for interrogating said storage positions with second search criteria including at least one interrogation data fact; means responsive to said interrogation with said second search criteria for providing an indication of each storage position that contains a record which matches said second search criteria; and selectively operable means responsive to said indication of each storage position that contains a record which matches said second search criteria for disabling for selection each corresponding previously enabled storage position.

References Cited by the Examiner

Rosin: "Associative Memory," IBM Technical Disclosure Bulletin, vol. 3, No. 10, March 1961, pp. 120–122.

BERNARD KONICK, *Primary Examiner.*

T. W. FEARS, *Assistant Examiner.*